(12) United States Patent
Aitken

(10) Patent No.: US 6,756,333 B2
(45) Date of Patent: Jun. 29, 2004

(54) DEVITRIFICATION-RESISTANT CHALCOGENIDE GLASSES

(75) Inventor: Bruce G. Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/290,738

(22) Filed: Nov. 8, 2002

(65) Prior Publication Data

US 2003/0104918 A1 Jun. 5, 2003

Related U.S. Application Data

(63) Continuation-in-part of application No. 09/894,587, filed on Jun. 28, 2001, now Pat. No. 6,503,859.

(51) Int. Cl.[7] .................................................. C03C 3/32
(52) U.S. Cl. ...................................................... 501/40
(58) Field of Search ............................................ 501/40

(56) References Cited

U.S. PATENT DOCUMENTS

| | | | |
|---|---|---|---|
| 2,883,294 A | 4/1959 | Jerger | 359/350 |
| 3,177,082 A | 4/1965 | MacAvoy | 501/40 |
| 3,241,986 A | 3/1966 | Jerger | 501/37 |
| 3,951,669 A | 4/1976 | Malmendier et al. | 106/39.6 |
| 4,314,031 A | 2/1982 | Sanford et al. | 501/44 |
| 4,920,078 A | 4/1990 | Bagley et al. | 257/626 |
| 4,996,172 A | 2/1991 | Beall et al. | 501/45 |
| 5,021,366 A | 6/1991 | Aitken | 501/45 |
| 5,122,484 A | 6/1992 | Beall et al. | 501/46 |
| 5,153,151 A | 10/1992 | Aitken | 501/45 |
| 5,256,604 A | 10/1993 | Aitken | 501/45 |
| 5,286,683 A | 2/1994 | Aitken | 501/45 |
| 5,926,599 A | 7/1999 | Bookbinder et al. | 385/137 |

*Primary Examiner*—David Sample
(74) *Attorney, Agent, or Firm*—Vincent T. Kung

(57) ABSTRACT

The invention resides in a molecular, inorganic glass and a method of making the glass, the glass being vitreous and resistant to devitrification, that is composed, in substantial part at least, of thermally-stable, zero-dimensional clusters or molecules, composed of four atoms of arsenic and three atoms of sulfur, the glass further containing up to 12 atomic percent of germanium, adjoining clusters being bonded to each other primarily by van der Waals forces, and at least 95% of the glass composition consisting of 42–60% arsenic, 37–48% sulfur plus selenium, the selenium being 0–14%.

20 Claims, 2 Drawing Sheets

$As_4S_3$ MOLECULAR CLUSTER

FIG. 1  As₄S₃ MOLECULAR CLUSTER

DEVITRIFICATION-RESISTANT CHALCOGENIDE GLASSES

RELATED PATENT APPLICATION

The present application claims benefit of priority as a continuation-in-part of U.S. patent application Ser. No. 09/894,587, filed on Jun. 28, 2001, now U.S. Pat. No. 6,503,859, which is incorporated herein.

FIELD OF THE INVENTION

The invention relates to molecular, inorganic glasses composed, at least in part, of one species including either thermally stable (i.e., persisting after annealing), zero-dimensional molecules or network-forming groups, composed of arsenic and sulfur atoms and associated with germanium atoms.

BACKGROUND OF THE INVENTION

The physical structure of a glass may be characterized by its dimensionality, that is, by the number of directions in which its components extend. Thus, vitreous selenium, which is believed to consist of intertwined chains of selenium atoms, is said to have a one-dimensional structure. Likewise, glassy $As_2S_3$, which consists of corrugated sheets of $As_2S_3$ pyramids that share corners, is described as having a two-dimensional structure. Considered in these structural terms, most oxide glasses are said to be three-dimensional.

A certain class of crystalline, inorganic compounds, known as molecular solids, has a zero-dimensional structure. This structure consists of molecular clusters in a cage-like form. As such, the clusters are repeated periodically in three dimensions, but are only bonded to each adjacent cluster by van der Waals forces. Examples of crystalline, inorganic compounds that have such a structure are known. They include arsenic sulfide, which consists of eight atom clusters designated $As_4S_4$, and phosphorus sulfide, which consists of 14 atom clusters designated as $P_4S_{10}$.

The possibility of an inorganic glass having such a structure has been suggested by R. Zallen. Zallen has suggested that such a zero-dimensional structure may occur temporarily in amorphous arsenic sulfide films which have been fabricated by vapor-phase deposition. Although such structure is found in these films initially upon cooling, it is thermally unstable in that it is lost upon annealing the films.

SUMMARY OF THE INVENTION

The present invention is based on a discovery that bulk, inorganic glasses can be produced, which consist almost entirely of thermally-stable, zero-dimensional clusters. These novel glasses have some physical properties similar to those observed in organic plastics. The glasses, however, also exhibit other properties that more closely resemble those found in conventional, three-dimensional, inorganic glasses such as complete transparency between the visible and infrared cutoff wavelengths. Unlike plastics, the present glasses are also essentially impermeable to gases and moisture. Hence, for instance, these glasses may be useful as low-temperature, hermetic, sealing materials in various industrial applications.

The invention resides, in part, in an inorganic glass that is resistant to devitrification. At least about 95% of the glass composition, in atomic percent, comprises about: 42–60% arsenic (As), up to 48% sulfur (S), 0–14% selenium (Se), or optionally, up to about 12% germanium (Ge); and comprising, in substantial part, at least one species including either thermally stable (i.e., persisting after annealing), zero-dimensional molecules or network-forming groups. Preferably, the glass has 37–48% sulfur, or the content of S+Se is about 37–48%. As used herein, the term "atomic percent" refers to the actual percent of the total number of atoms present in a composition. Thus, the value given for a particular element represents the percent of atoms of that element present in a composition relative to 100 percent for the total number of atoms in the composition.

According to an embodiment, at least a portion of the zero-dimensional molecules or clusters has a composition comprising either four atoms of arsenic and three atoms of sulfur ($As_4S_3$), or four atoms each of arsenic and sulfur ($As_4S_4$). The zero-dimensional molecular clusters are bonded to each other primarily by van der Waals forces. Alternatively, at least a portion of the network-forming groups comprise a variety of species, expressed in terms of As—(S, As)$_n$ units, wherein n≠zero. Examples may include either $AsS_3$ ($AsS_{3/2}$, wherein the S atoms are shared with other adjacent As atoms), $AsAsS_2$, $AsSAs_2$, or $AsAs_3$.

The invention further resides in a method of producing a thermally-stable, As—S glass that is composed, in part at least, of zero-dimensional clusters composed of four atoms of arsenic and three atoms of sulfur, or four atoms each of arsenic and sulfur. The method comprises forming a mixture of 42–60% arsenic, 37–48% S+Se, wherein the Se is 0–14%, with, optionally, up to 12% germanium (Ge), and melting the mixture to form a devitrification-resistant, inorganic glass melt.

Additional features and advantages of the present method and array device will be disclosed in the following detailed description. It is understood that both the foregoing summary and the following detailed description and examples are merely representative of the invention, and are intended to provide an overview for understanding the invention as claimed.

DESCRIPTION OF THE INVENTION

The present invention is based in-part on a discovery of bulk glasses that contain either thermally-stable, zero-dimensional, atomic clusters or molecules, or network-forming groups. Although these chalcogenide glasses exhibit properties comparable to those observed in conventional, inorganic glasses having three-dimensional structures, certain embodiments of the unique material also possess some properties similar to those found in ordinary, organic plastics. For instance, the glass is plastically malleable at a temperature of less than or equal to about 125° C. Depending on specific compositions, the temperature at which the glass is plastically malleable can be as low as ≤about 50° C. In some embodiments, one can begin to bend plastically the glass at a temperature slightly above normal human body temperature. Therefore, these unique glasses are termed "plastic glasses."

Figure 1:
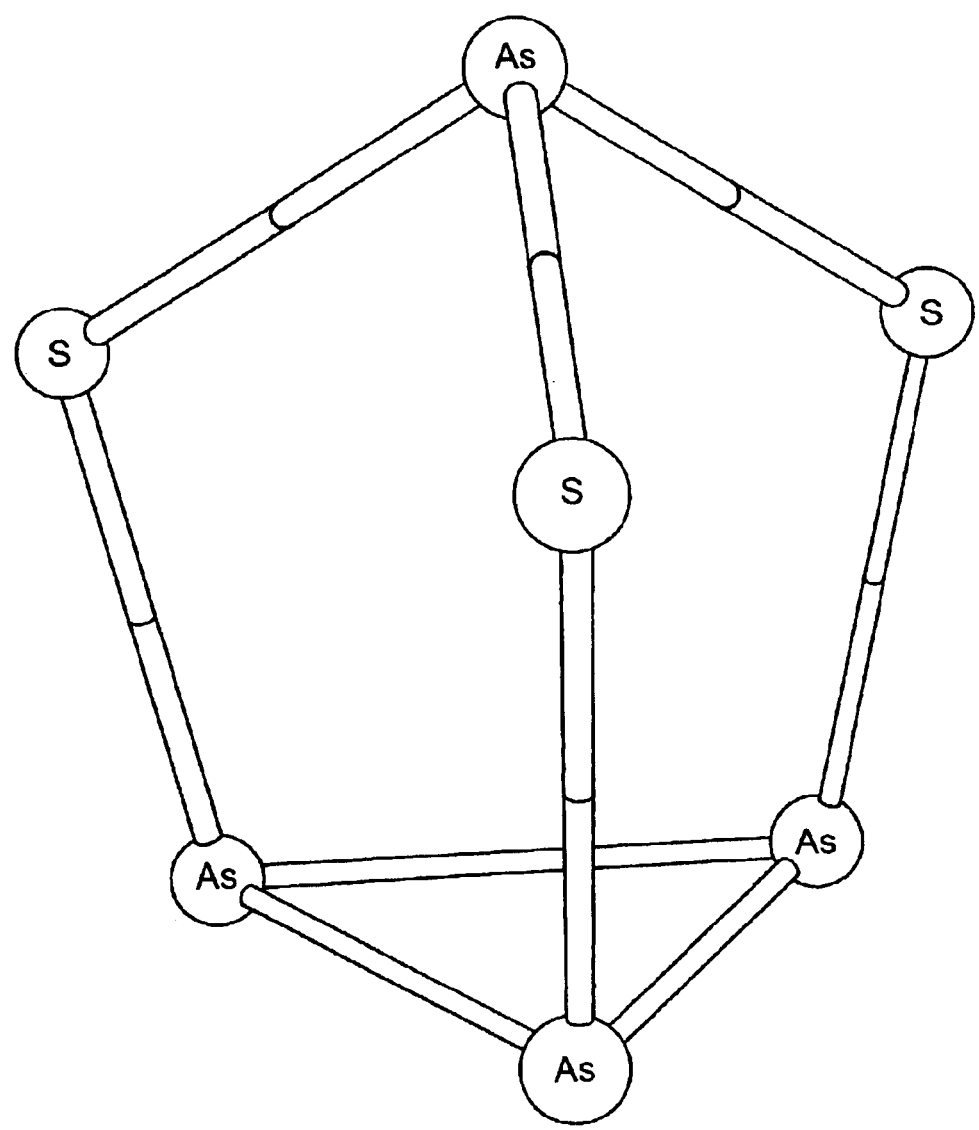
FIG. 1 is a schematic representation of an $As_4S_3$ molecular cluster in accordance with the invention.

The glasses may be almost entirely composed of the zero-dimensional clusters. A characteristic species of such clusters of atoms in the present glasses are composed of four (4) arsenic atoms and three (3) sulfur atoms. Other species with four As and four S atoms also may co-exist. The species having seven (7) atoms is believed to be arranged in a cage-like manner as shown in FIG. 1 of the accompanying drawings. The structure, as shown, extends in three directions. The clusters exist independently, except as they are bonded together by van der Waals forces.

The role of germanium in the present glasses is not clear. It is not known whether or not the germanium atom actually enters the $As_4S_3$ cluster as such. In any event, it appears to be closely associated with the $As_4S_3$ cluster and is influential in the observed properties of the glasses.

Glass formation in the GeAsS system is, of course, well known. Yet, the present compositional area lies outside known glass-forming regions. Intermediate to these regions is a narrow zone in which compositions may be melted, but in which they tend to phase-separate, or spontaneously crystallize, on cooling.

The present, inventive, plastic glasses have an electronic absorption edge that lies at a shorter wavelength than that of known GeAsS glasses with comparable sulfur content. This characteristic results in the plastic glasses possessing unexpectedly broad, visible transparency. For example, the absorption edge of known GeAsS glass containing 45% sulfur lies at wavelengths in excess of 700 nm, whereas that of a plastic glass with the same sulfur content occurs at 620 nm.

TABLE 1, below, sets forth, in atomic percent, several compositions, which are illustrative of glasses in which the atoms substantially completely occur in clusters, as illustrated in FIG. 1. Also summarized in the TABLE are the exceptionally low Tg temperatures that characterize these glasses, as well as the softening point ($T_s$), density, electrical resistivity (log ρ) and coefficient of thermal expansion data (CTE) values measured on the glasses. The latter are exceptionally large, being among the highest values observed in inorganic glasses.

within an evacuated, fused silica ampoule and melted at 800° C. for 40 hours. The melt was initially quenched by plunging the ampoule into water. The resultant glass was cooled slowly from 200° C. to room temperature (25° C.) with no sign of devitrification. The glass rod thus produced was then reheated in air to 100° C., about 30° C. above the glass softening point, and cooled. Again, no sign of crystallization was observed.

The plastic glass of Example 1 was completely transparent in the near infrared (IR), which may be useful for optical telecommunication transmissions. In contrast to organic polymers, it showed no discrete absorption peaks, other than impurities, between its visible absorption edge near 600 nm and the IR edge at about 12 $\mu$m. In further contrast to organic polymers, this glass tends to be quite impermeable.

In addition to the plastic glasses just described, wherein the $As_4S_3$ clusters essentially constitute the glass, an adjacent compositional area has been identified in which the $As_4S_3$ structure is prominent.

Glasses in this adjacent compositional area, having higher Tg values over 100° C., are composed essentially of 42–60% arsenic (As), 37–48% sulfur (S) plus selenium (Sc), the selenium being 0–14%, and 5–12% germanium (Ge).

These glasses, as might be expected, have substantially larger Tg values, generally over 100° C. In contrast, glasses, where the $As_4S_3$ cluster structure essentially constitutes the entire glass, have a Tg under 100° C., and generally below 50° C.

TABLE 2 shows examples of these transitional, or modified, glass compositions. Also, the Tg, density and CTE values are presented. As becomes apparent, the Tg values are significantly higher, while the CTE values are lower. These glasses are batched and melted in the same manner as those in TABLE 1 above.

TABLE 1

| Element (Atomic %) | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Ge | 3 | 1.3 | 2.5 | 1.3 | 1.3 | 2.5 | 3 | 3 | 3 | 5 | 1.3 |
| As | 52 | 55 | 55 | 58.7 | 53.7 | 51.3 | 52 | 52 | 52 | 50 | 56.2 |
| S | 45 | 43.7 | 42.5 | 40 | 45 | 46.2 | 40.5 | 31.5 | 36 | 45 | 42.5 |
| Se | — | — | — | — | — | — | 4.5 | 13.5 | 9 | — | — |
| Tg ° C. | 39 | 19 | 42 | 21 | 14 | 34 | 43 | 54 | 45 | 51 | 29 |
| Density | 3.42 | 3.43 | 3.49 | 3.44 | 3.40 | 3.39 | — | — | | 3.42 | 3.47 |
| CTE × $10^{-7}$/° C. | 958 | | | | | | | | | | |
| Ts | 68 | | 85 | | | 49 | 78 | | 79 | | 49 |
| log ρ | 13.3 | | | | | | | | | | |

These glasses have very low Tg values that are below 100° C., and generally no greater than 50° C. Since some of the values are below an ambient temperature of about 25° C., the corresponding glass can be deformed plastically at normal room temperatures. In general, these glasses are very durable. For example, a sample of glass 1 in TABLE 1 was soaked in water at room temperature for six months without showing any weight loss. The glass is also resistant to acid attack, and to devitrification.

These glasses are composed essentially of 46–60% arsenic (As), 39–48% sulfur (S) plus selenium (Se), the selenium being 0–14%, and, optionally, up to 6% germanium (Ge). A particularly preferred range of compositions, which includes preferred compositions 1 and 6, consists essentially of 48–54% As, 44.5–47.5% S and 1.5–4.5 Ge.

A 36 gram batch was mixed in accordance with the proportions of Example 1 in TABLE 1. The batch was sealed

TABLE 2

| Element (Atomic %) | Ex. 12 | Ex. 13 | Ex. 14 | Ex. 15 |
|---|---|---|---|---|
| Ge | 7.5 | 5 | 5 | 10 |
| As | 52.5 | 55 | 52.5 | 45 |
| S | 40 | 40 | 42.5 | 45 |
| Tg ° C. | 202 | 192 | | 220 |
| Density | 3.52 | | 3.43 | |
| CTE × $10^{-7}$/° C. | 405 | | | |
| Ts | 329 | | | |

Figure 2:
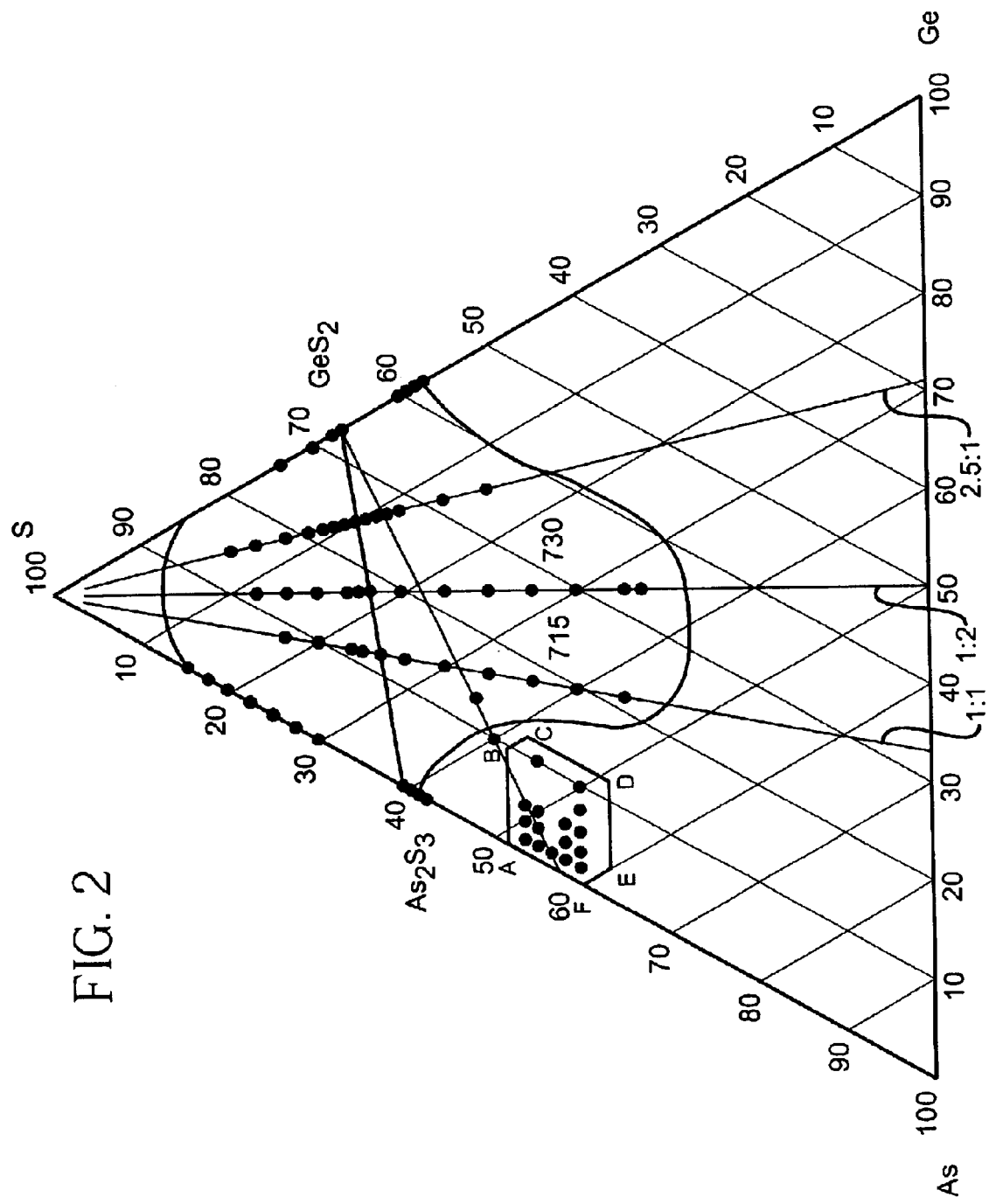
FIG. 2 is a ternary diagram showing the compositional area in accordance with the invention.

FIG. 2 is a ternary diagram showing the total compositional area for glasses in accordance with the present invention. In the diagram, the apex, labeled S, represents 100% S; the right end of the base line, labeled Ge, represents 100%

Ge; the left end of the base line, labeled As, represents 100% As. Glass compositions in accordance with the present invention are included within the area labeled ABCDEF. As noted earlier, the plotted values are in terms of atomic percent, that is the actual percent of the total number of atoms present represented by each element.

In terms of composition, glasses in accordance with the present invention consist essentially of 42–60% As, 37–48% S and up to 12% Ge. Up to about 30% of the sulfur content may be replaced by selenium, that is an amount up to about 14% Se. Attempts to substitute tellurium for sulfur, tin for Ge, and phosphorus or antimony for arsenic have been largely unsuccessful. The melts have tended to result in crystallized materials if such alternative additives exceed about 5% in total. Individually, these optional ingredients must not exceed 5% tellurium, 2% tin, 5% antimony, and 2.5% phosphorus, the total collectively not exceeding 5%.

Table 3 provides additional compositional examples 16–26, according to the present invention, and compares them to the glasses in examples 1–15.

The unusual properties of the inventive glasses, particularly their low Tgs and softening points, render them good candidates for a variety of potential uses. These applications may range from optical elements to durable sealing glasses to a host material for unstable, inorganic dyes. An optical element may include a moldable lens or microlens, an array of lenses or microlenses, a surface relief diffuser, a grating, or other diffractive element. The lens, microlens, or array of lenses or microlenses, may have either a spherical, aspherical, or aspheric-diffractive surface.

The present invention has been described in general and in detail by way of examples. Persons of skill in the art understand that the invention is not limited necessarily to the embodiments specifically disclosed, but that modifications and variations may be made without departing from the scope of the invention as defined by the following claims or their equivalents, including other equivalent components presently known, or to be developed, which may be used within the scope of the present invention. Therefore, unless changes otherwise depart from the scope of the invention, the changes should be construed as being included herein.

I claim:

1. A glass that is resistant to devitrification, having at least about 95% of the glass composition, in atomic percent, comprising about: 42–60% arsenic, 37–48% sulfur, 0–14% selenium, or optionally, up to about 12% germanium; and comprising, in substantial part, at least one species including either thermally stable, zero-dimensional molecules or thermally stable, zero-dimensional network-forming groups.

2. The glass according to claim 1, wherein at least a portion of said zero-dimensional molecules have a composition comprising $As_4S_3$.

3. The glass according to claim 1, wherein at least a portion of said zero-dimensional molecules have a composition comprising $As_4S_4$.

4. The glass according to claim 1, wherein at least a portion of said network-forming groups have a composition comprising $As-(S,As)_n$ units.

5. The glass according to claim 2, wherein adjoining zero-dimensional molecules are bond to each other primarily by van der Waals forces.

6. The glass according to claim 1, wherein said glass optionally contains up to about 5% tellurium (Te), not over about 2% tin (Sn), up to about 5% antimony (Sb), and not over about 2.5% phosphorus (P), with a content of these components not to exceed about 5% in total.

7. The glass according to claim 1, wherein said glass is made by a process including either a melting/quenching, sputtering, vapor-phase deposition, or other chemical deposition technique.

8. The glass according to claim 1, wherein said glass has a Tg not over 100° C. and consists essentially of about 46–60% arsenic, 39–48% sulfur, and 0–14% selenium, and optionally of up to about 6% germanium.

9. The glass according to claim 5, wherein said glass consists essentially of about: 48–54% As, 44.5–47.5% S and 1.5–4.5% Ge.

10. The glass according to claim 1, wherein said glass has a Tg greater than 100° C. and consists essentially of about 42–60% arsenic, 37–48% sulfur, and 0–14% selenium, and about 6.1–12% germanium.

11. The glass according to claim 1, wherein said glass is transparent between a visible absorption edge near about 600 nm to about 1200 nm in the near infrared.

| EXAMPLE | Ge | As2S3 | S | Absorption Edge (nm) | T† | Soft. Pt. (° C.) | CTE (ppm/° C.) | Density at 20° C. | Molar volume at 20° C. |
| --- | --- | --- | --- | --- | --- | --- | --- | --- | --- |
| 1 | 3 | 52 | 45 | 619.2 | 39.1 | 68 | 95.75 | 3.4156 | 16.268 |
| 2 | 1.25 | 55 | 43.75 | | 18.8 | | | 3.4321 | 16.357 |
| 3 | 2.5 | 55 | 42.5 | 671.3 | 42 | 85 | | 3.4889 | 16.236 |
| 4 | 1.25 | 58.75 | 40 | 635 | 21.1 | | | 3.4445 | 16.765 |
| 5 | 1.25 | 53.75 | 45 | | 14.2 | | | 3.4004 | 16.352 |
| 6 | 2.5 | 51.25 | 46.25 | 595.4 | 33.6 | 49 | | 3.3908 | 16.232 |
| 10 | 5 | 50 | 45 | | 50.7 | | | 3.4243 | 16.213 |
| 11 | 1.25 | 56.25 | 42.5 | 650.1 | 29.5 | 49 | | 3.4725 | 16.321 |
| 12 | 7.5 | 52.5 | 40 | 683.2 | 202 | 329 | 40.54 | 3.5175 | 16.376 |
| 13 | 5 | 55 | 40 | | 191.9 | | | | |
| 14 | 5 | 52.5 | 42.5 | | | | | 3.4325 | 16.486 |
| 15 | 10 | 45 | 45 | 690.5 | | 341 | 40.49 | 3.388 | 16.352 |
| 16 | 10 | 50 | 40 | 723 | 267.3 | 383 | 28.86 | 3.5333 | 16.286 |
| 17 | 15 | 45 | 40 | 728.2 | 320.7 | 435 | 17.84 | 3.559 | 16.136 |
| 18 | 2.5 | 57.5 | 40 | | 40.2 | | | | |
| 19 | 3 | 51 | 46 | 609 | | | | 3.4066 | 16.185 |
| 20 | 2 | 52 | 46 | 591.6 | | | | 3.3915 | 16.264 |
| 21 | 3 | 50 | 47 | 604.7 | | | | 3.3845 | 16.164 |
| 22 | 2 | 51 | 47 | | | | | 3.3813 | 16.186 |
| 23 | 2.5 | 51.5 | 46 | 611.6 | | | | 3.4012 | 16.214 |
| 24 | 3 | 50.5 | 46.5 | 600 | | | | 3.3949 | 16.178 |
| 25 | 2.5 | 51 | 46.5 | 588.7 | | | | 3.3946 | 16.182 |
| 26 | 2 | 51.5 | 46.5 | 585.7 | | | | 3.388 | 16.217 |

12. The glass according to claim 1, wherein said glass exhibits a CTE of about $15 \times 10^{-7}/°$ C. to about $100 \times 10^{-7}/°$ C.

13. A chalcogenide glass having at least about 95% of the glass composition, in atomic percent, consisting essentially of about: 42–60% arsenic, 37–48% sulfur, 0–14% selenium, or optionally, up to about 12% germanium; and comprising, in substantial part, at least one species including either thermally stable, zero-dimensional molecules or thermally stable, zero-dimensional network-forming groups, wherein said glass is plastically malleable at a temperature of less than or equal to about 125° C.

14. The glass according to claim 13, wherein said glass is plastically malleable at a temperature of $\leq$ about 50° C.

15. An optical element made from an inorganic glass that is resistant to devitrification, having at least about 95% of the glass composition, in atomic percent, comprising about: 42–60% arsenic, 37–48% sulfur, 0–14% selenium, or optionally, up to about 12% germanium; and said glass comprising, in substantial part, at least one species including either thermally stable, zero-dimensional molecules or thermally stable, zero-dimensional network-forming groups.

16. The optical element according to claim 15, wherein said element includes a lens, a microlens, an array of lenses or micro lenses, a grating, or a surface relief diffuser.

17. The optical element according to claim 16, wherein said lens, microlens, or array of lenses or microlenses, has either a spherical, aspherical, or aspheric-diffractive surface.

18. The optical element according to claim 16, wherein said optical element is a diffractive element.

19. A host material for unstable inorganic dyes comprising a glass having at least about 95% of the glass composition, in atomic percent, consisting essentially of about: 42–60% arsenic, 37–48% sulfur, 0–14% selenium, or optionally, up to about 12% germanium; and said glass comprising, in substantial part, at least one species including either thermally stable, zero-dimensional molecules or thermally stable, zero-dimensional network-forming groups.

20. A low-temperature, hermetic sealing material comprising: a glass having at least about 95% of the glass composition, in atomic percent, consisting essentially of about: 42–60% arsenic, 37–48% sulfur, 0–14% selenium, or optionally, up to about 12% germanium; and said glass comprising, in substantial part, at least one species including either thermally stable, zero-dimensional molecules or thermally stable, zero-dimensional network-forming groups.

* * * * *